(12) United States Patent
Gross

(10) Patent No.: US 10,723,458 B2
(45) Date of Patent: Jul. 28, 2020

(54) EXPANDABLE CARGO STORAGE, TRANSPORTATION MEANS SECTION, TRANSPORTATION MEANS AND METHOD OF OPERATING A CARGO STORAGE, A TRANSPORTATION MEANS SECTION, OR A TRANSPORTATION MEANS

(71) Applicant: Airbus Operations GmbH, Hamburg (DE)

(72) Inventor: Claus-Peter Gross, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 273 days.

(21) Appl. No.: 15/622,347

(22) Filed: Jun. 14, 2017

(65) Prior Publication Data
US 2017/0361932 A1    Dec. 21, 2017

(30) Foreign Application Priority Data
Jun. 17, 2016   (DE) .................. 10 2016 210 856

(51) Int. Cl.
*B64C 1/22*       (2006.01)
*B64D 11/00*   (2006.01)
*B64D 11/06*   (2006.01)

(52) U.S. Cl.
CPC ........... *B64D 11/0023* (2013.01); *B64C 1/22* (2013.01); *B64D 11/064* (2014.12)

(58) Field of Classification Search
CPC .................................................. B64D 11/0023
(Continued)

(56) References Cited

U.S. PATENT DOCUMENTS 3,526,066 A * 9/1970 Gamble ................. E04B 1/3444
52/27
3,578,050 A * 5/1971 Weingarten ............ B65D 88/14
206/386
(Continued)

FOREIGN PATENT DOCUMENTS

DE          2506358         8/1976
DE      102007062873      8/2009
(Continued)

OTHER PUBLICATIONS

German Search Report, dated Dec. 19, 2016, priority document.

*Primary Examiner* — Alvin C Chin-Shue
(74) *Attorney, Agent, or Firm* — Greer, Burns & Crain, Ltd.

(57) ABSTRACT

An expandable cargo storage for a transportation means, comprising a first storage wall and a second storage wall opposite of the first storage wall, and a plurality of foldable walls arranged between the first and the second storage wall, each of the plurality of foldable walls being foldable between a first position in which the respective foldable wall is arranged essentially in parallel with the second storage wall, and a second position in which the foldable wall is arranged essentially perpendicularly to the second storage wall, wherein, when each of the foldable walls is arranged in its first position, the cargo storage is in a first operational state enclosing a first volume, and when each of the foldable walls is in its second position, the cargo storage is in a second operational state enclosing a second volume which is larger than the first volume.

10 Claims, 8 Drawing Sheets

(58) Field of Classification Search
USPC .................................................... 244/118.1
See application file for complete search history.

(56) References Cited

U.S. PATENT DOCUMENTS

| | | | | |
|---|---|---|---|---|
| 3,645,596 | A * | 2/1972 | Russell-French | A47B 43/00 |
| | | | | 312/258 |
| 3,999,727 | A * | 12/1976 | Rennemann | B64D 9/00 |
| | | | | 206/298 |
| 4,829,726 | A | 5/1989 | de Potter | |
| 5,752,673 | A | 5/1998 | Schliwa et al. | |
| 5,890,612 | A * | 4/1999 | Coppi | B65D 88/524 |
| | | | | 206/600 |
| 6,047,588 | A * | 4/2000 | Danilychev | B65D 88/14 |
| | | | | 206/524.8 |
| 6,312,040 | B1 * | 11/2001 | Shinohara | B60J 7/065 |
| | | | | 296/100.12 |
| 7,823,739 | B2 * | 11/2010 | Sadkin | B65D 88/524 |
| | | | | 220/1.5 |
| 8,256,635 | B2 * | 9/2012 | Schardein | B65D 88/14 |
| | | | | 220/1.5 |
| 2009/0184126 | A1 | 7/2009 | Glaser et al. | |
| 2015/0307179 | A1 * | 10/2015 | Ehlers | B64C 1/20 |
| | | | | 244/118.1 |

FOREIGN PATENT DOCUMENTS

| | | |
|---|---|---|
| EP | 0681956 | 11/1995 |
| EP | 1848531 | 10/2007 |

\* cited by examiner

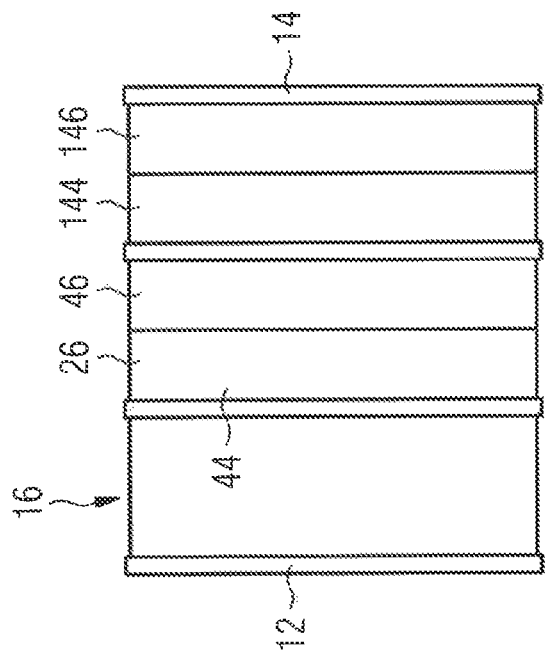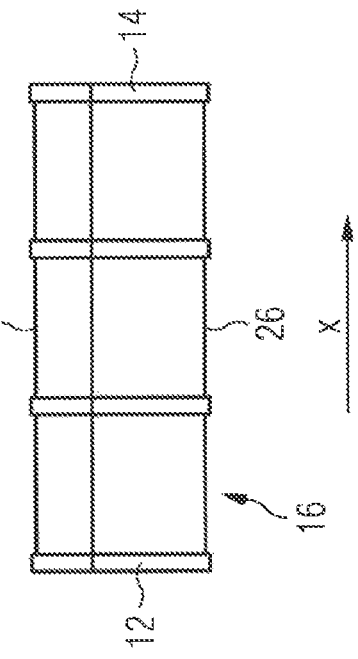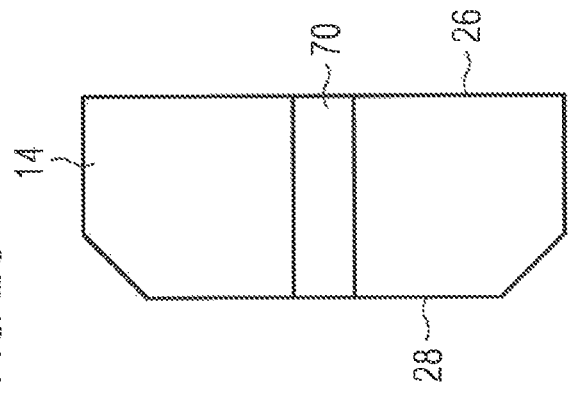

EXPANDABLE CARGO STORAGE, TRANSPORTATION MEANS SECTION, TRANSPORTATION MEANS AND METHOD OF OPERATING A CARGO STORAGE, A TRANSPORTATION MEANS SECTION, OR A TRANSPORTATION MEANS

CROSS-REFERENCES TO RELATED APPLICATIONS

This application claims the benefit of the German patent application No. 10 2016 210 856.5 filed on Jun. 17, 2016, the entire disclosures of which are incorporated herein by way of reference.

BACKGROUND OF THE INVENTION

The present invention concerns an expandable cargo storage, a transportation means section having the expandable cargo storage, a transportation means having the transportation means section or the expandable cargo storage, as well as a method of operating such an expandable cargo storage, transportation means section or transportation means.

Modern transportation means, such as aircraft or trains, may be configured for transporting freight and passengers at the same time. Therefore, space within transportation means available for transporting is typically divided into a passenger compartment and a freight/cargo hold. For example, in aircraft according to the prior art having two decks (see, e.g., document EP 0 681 956 A1), the upper deck typically forms a passenger compartment in which the passengers are seated, whereas cargo is transported on the lower deck (i.e., the main deck). The cargo, e.g. the luggage of the passengers aboard the aircraft, may be arranged directly in the cargo bay of the aircraft, or in extra containers or pallets chargeable with freight before being loaded to the aircraft. Such an extra container is, e.g., described in document DE 10 2007 062 873 A1.

After the transportation means, e.g. the passenger aircraft, has reached its destination, the transported passengers leave the aircraft and eventually cargo is unloaded at the airport gate. Thereafter, the aircraft may be serviced and prepared by ground staff and/or cabin crew for the subsequent flight, whereby, for example, the seat configuration of the passenger cabin may be adapted. The time during which the aircraft must remain parked at the gate is called turnaround time. Usually, it starts when the aircraft receives the parking chocks and ends by removing them. Since direct operating costs of the aircraft generally scale with the turnaround time, it is desirable to keep the same as short as possible.

SUMMARY OF THE INVENTION

The present invention is directed to an object of providing a cargo storage that allows for operating a transportation means more cost-efficiently and more flexibly. Furthermore, the invention is directed to an object of providing a section of a transportation means having such cargo storage, and a transportation means having the section of the transportation means and/or the cargo storage. Moreover, the invention is directed to a method of operating the cargo storage in this manner.

The expandable cargo storage (i.e., cargo compartment) is provided for a transportation means, and comprises a first storage wall and a second storage wall opposite of the first storage wall, as well as a plurality of foldable walls arranged between the first and the second storage wall. Each of the plurality of foldable walls is foldable between a first position in which the respective foldable wall is arranged essentially in parallel with the second storage wall, and a second position in which the foldable wall is arranged essentially perpendicularly to the second storage wall. Moreover, each foldable wall may also be arranged in parallel to the first storage wall. Optionally, the first and second storage walls may be parallel to each other. The first storage wall and the second storage wall may delimit the cargo storage in a first direction and in a second direction opposing the first direction, respectively.

Essentially arranged in parallel means in the present context that the foldable walls may be arranged at a slight angle relative to the first/second storage walls. For example, an angle between the main surface of the foldable wall and the second storage wall may be less than 15 degrees, preferably less than 10 or 5 degrees, in this configuration. It is conceivable that the angle between the main surface of the foldable wall and the second storage wall is 0 degrees.

When each of the foldable walls is arranged in its first position, the cargo storage is in a first operational state enclosing a first volume. For example, the first volume may be less than 5% larger than the total volume of the foldable walls, thus so small that a human cannot fit in the cargo storage. Alternatively, the first volume may be less than 10 $m^3$, preferably less than 5 $m^3$. On the other hand, when each of the foldable walls is in its second position, the cargo storage is in a second operational state enclosing a second volume which is larger than the first volume. The second volume may be at least n times (n=2, 3, . . . ), preferably twice, most preferably three times as large as the first volume.

Moreover, it is conceivable that the cargo storage is in an intermediate third operational state in which a first part of the plurality of foldable walls is arranged in their second position, whereas the remaining foldable walls are in their first position. In this intermediate third operational state, the cargo storage encloses a third volume which is larger than the first volume and smaller than the second volume. E.g., the third volume may be twice as large as the first volume. Optionally, the third volume may be two thirds of the second volume.

In each of the first, second and third operational states, the cargo storage forms an enclosure for cargo/freight to be stowed therein. This enclosure may be fluid-tightly sealed against its environment. In this case, fire, liquids, gases, smoke, and/or suppression agents can only escape from the cargo storage in non-hazardous quantities or be entirely hindered from escaping the cargo storage. In other words, the cargo storage may be hermetically sealed. Hermetical sealing can be achieved, for example, by means of membrane elements provided at hinge joints between and/or sealing gaskets at the edges of the foldable walls. Accordingly, the cargo storage may be designed as a so called full cargo classified class C cargo compartment. Alternatively, the cargo storage may be classified as a class F cargo compartment. Moreover, the cargo storage may be provided with a smoke and/or fire detecting system. A fire extinguishing or fire suppression system may be provided in the cargo storage, so that, if a fire breaks out in the cargo storage, it can be effectively fought within the cargo storage without having to be accessed from the outside.

Additionally, the cargo storage may comprise a first expandable section which comprises at least a part of the plurality of foldable walls. The first expandable section may comprise one or more supporting portions arranged between the first storage wall and the second storage wall such as to define one or more cargo bays adjacent to the supporting portions when the cargo storage is in its second operational state. Herein, the supporting portion/s need not be spaced apart from the first/second storage wall. Rather, it is conceivable that a supporting portion is formed at, optionally integrally with, the first/second storage wall. In other words, the supporting portion may form part of or be the first/second storage wall. To one or more of the supporting portions, e.g., to each of the supporting portions, a net is fixed, which net is configured for securing pieces of cargo (e.g., luggage pieces) in the event of bulk loading. The net extends in parallel to the first and second storage walls. Accordingly, the net is arranged such as to secure the pieces of cargo to the respective cargo bay into which the respective piece has been loaded.

One or more of the plurality of foldable walls may be associated with a supporting portion, particularly, attached thereto and carried thereby. Moreover, it is conceivable that at least one of the supporting portions is shaped as a frame extending essentially in parallel to any of the first and second storage walls. The supporting portion may additionally extend in the first or second direction, such that one or more of the plurality of foldable walls associated with the supporting portions may be arranged at least partly, preferably entirely, to the interior of the supporting portion when respective foldable wall is in its first position in which it extends in parallel to the first/second storage wall. Optionally, the supporting portion or frame may have essentially the same contour as the first and/or the second storage wall in a plane parallel to the first or second storage wall.

A first supporting portion may be arranged at and formed integrally with the first storage wall, a second supporting portion may be arranged between, e.g. centrally between, the first and second storage walls, and a third supporting portion may be arranged at and formed integrally with the second storage wall. When the cargo storage is in its second operational state, a first cargo bay may be formed between the first supporting portion and the second supporting portion, and a second cargo bay may be formed between the second supporting portion and the third supporting portion. In this case, the second supporting portion is adapted to interconnect the first cargo bay and the second cargo bay. Generally, it is conceivable that each supporting portion of the cargo storage is adapted to interconnect two cargo bays.

When the cargo storage is in its intermediate third operational state, the second supporting portion may be arranged adjacent to the third supporting portion, and the first supporting portion may be arranged at a distance from the second and third supporting portions. Accordingly, only the first one of the first and second cargo bays, thus a subset of the total amount of formable cargo bays, is formed in this state. Moreover, when the cargo storage is in its first operational state, the first, second and third supporting portions are arranged adjacent to each other, and neither the first cargo bay, nor the second cargo bay is formed.

In an embodiment, a first foldable wall of the plurality of foldable walls comprises a first section and a second section. The first section of the first foldable wall may be pivotably coupled to the second section of the first foldable wall such as to be foldable relative to the second section about a first axis. Moreover, the first section of the first foldable wall may be further pivotably coupled to a first one of the supporting portions such as to be foldable relative to the first supporting portion about a second axis that is parallel to the first axis. Preferably, the second section of the first foldable wall is further pivotably coupled to a second one of the supporting portions such as to be foldable relative to the second supporting portion about a third axis. This axis may be parallel to the first axis.

A second foldable wall of the plurality of foldable walls may comprise a first section and a second section. The first section of the second foldable wall may be pivotably coupled to the second section of the second foldable wall such as to be foldable relative to the second foldable wall about a fourth axis. In this case, the second section of the second foldable wall is preferably pivotably coupled to a third one of the supporting portions such as to be foldable relative to the third supporting portion about a fifth axis that is perpendicular or parallel to the fourth axis.

Moreover, a third foldable wall of the plurality of foldable walls may be formed in one piece and may be foldable about a sixth axis extending in parallel with a fourth one of the supporting portions. In one embodiment, the first, the second and/or the third supporting portion is formed integrally with the first or the second storage wall. The one piece in which the third foldable wall is formed is preferably flat.

In the context of the present patent application, the terms "first," "second," "third," etc. are meant merely enumerative. Thus, the cargo storage may separately comprise any one or more of the components numbered in this way. For example, the cargo storage may comprise the second foldable wall without comprising the first foldable wall. Particularly, the cargo storage may comprise one or more of the first, second and/or third foldable walls.

The first, second and/or third foldable wall preferably forms part of the first expandable section. In particular, the first foldable wall preferably forms a portion of the ceiling of the cargo storage, the second foldable wall preferably forms a portion of a side wall of the cargo storage, and the third foldable wall preferably forms a portion of the floor of the cargo storage. However, it is generally conceivable that any of the first, second, or third foldable walls forms a portion of the ceiling, of the floor or of one of the side walls of the cargo storage. Foldable walls forming the floor of the cargo storage are advantageously provided with an integrated cargo loading system. Foldable walls forming the ceiling of the cargo storage are optionally formed as a light cover adapted to break in the event of rapid decompression. Foldable walls forming the side walls of the cargo storage are formed robust to resist impact by bulk load such as airfreight containers or pieces of passenger luggage.

Optionally, the foldable wall forming a portion of the floor of the cargo storage when arranged in its second position, comprises a hatch or further door adapted to provide a passage through this foldable wall when this foldable wall is in its first position.

Preferably, each of the first, second and third foldable walls is designed such as to entirely, i.e. with any of its sections, extend along a single plane that is arranged perpendicularly to the first/second storage wall when the respective foldable wall is in its second position. Moreover, at least in this position, it is further preferred that each of the first, second and third foldable walls interconnects two neighboring supporting portions. In this case, each of these walls extends from one of the supporting portions to another (neighboring) supporting portion.

Furthermore, the cargo storage may have one or more fixed sections. Each of the fixed sections may be configured such that its interior (i.e., enclosed) volume is the same when the cargo storage is in its first and its second operational state. In this case, the fixed section preferably has the same dimensions when the cargo storage is in its first operational state and when the cargo storage is in its second operational state. In other words, the size of the fixed section remains unchanged, independently of the state in which the cargo storage is. The fixed section may be arranged between two supporting portions. Advantageously, the fixed section is arranged adjacent to the first storage wall or the second storage wall, and may comprise the first storage wall or the second storage wall.

In a further embodiment, the cargo storage comprises one or more second expandable sections in addition to the first expandable section. Each of these second expandable sections may have one or more of the features described hereinabove with respect to the first expandable section. Particularly, the second expandable section may comprise one or more supporting portions having the properties of any one of the first, second or third supporting portion, and being arranged between the first expandable section and the first or second storage wall. If the cargo storage comprises the fixed section, one or more of the second expandable sections may be arranged between the fixed section and the first expandable section, or the first expandable section may be arranged between the fixed section at least one of the second expandable sections.

Preferably, one of the second expandable sections having a fourth supporting portion is arranged between the third supporting portion and the second storage wall. In this case, a fourth supporting portion is arranged at the second storage wall, and further ones of the plurality of foldable walls formed like the first, second and third foldable walls are provided for connecting the third and fourth supporting portions when the further foldable walls are in their second position. Advantageously, the fourth supporting portion may have the hereinabove described features of the third supporting portion, wherein the third supporting portion, in this configuration, is not formed at the second storage wall.

In a further embodiment, the cargo storage comprises one or more doors for providing access to the interior of the cargo storage. A first door may be formed in any of the above described structural parts of the cargo storage, such as in the first storage wall, in the second storage wall, in one or more of the foldable walls, or in any of the supporting portions. Preferably, the first door is arranged in the first storage wall. In case the cargo storage comprises a fixed section, the first door is advantageously arranged in a side wall of a fixed section or in a structural part adapted to delimit the fixed section. Thus, a human can, e.g., enter the fixed section to expand the cargo storage from its first operational state into its second/third operational state from the inside of the fixed section. For example, the first door may be arranged in a side wall of the fixed section extending in the first direction. The second door may have two parts pivoting in opposite directions, wherein one of the parts is pivotably coupled to the floor of the fixed section and the other one of the parts is pivotably coupled to the ceiling of the fixed section. Moreover, a second door may be formed in a lateral wall of the cargo storage or in any of the first or second storage walls. At least one of the first and second doors may be sized such that a freight container can be introduced into the cargo storage through the respective door. For example, the first door may be adapted to allow loading and unloading freight to the cargo storage, and the second door may be smaller than the first door and be adapted to provide access for humans.

The cargo storage may further comprise a linear guiding system adapted for linearly guiding the first storage wall in a direction perpendicular to first storage wall and/or the second storage wall in a direction perpendicular to the second storage wall. For example, the guiding system may comprise one or more guiding rails. Each one of those rails may be arranged vertically above or below the first storage wall, the second storage wall, the first/second expandable section and/or the fixed section. Preferably, each one of the supporting portions is attached to at least one of the guiding rails such as to be linearly guided in the first and/or the second direction. Additionally, the cargo storage may comprise a cargo loading system. Optionally, a cargo loading system locking mechanism may be integrated into the cargo storage.

A transportation means section, particularly an aircraft section or a train section, comprises a cargo storage described above in details and at least one foldable seat. The foldable seat is adapted for being displaced perpendicularly to the first and/or the second storage wall between a first state and a second state. In the first state, the seat is essentially unfolded and arranged in a first position. In the second state, the seat is essentially folded and arranged in a second position farther away from the first storage wall than the first position, whereby a space to which the cargo storage is expanded when the cargo storage is in its second operational state is cleared by the seat. When the seat is folded, its seating surface is folded up such as to face the backrest of the seat.

The cargo storage may be arranged within a section of the passenger cabin. In this case, the cargo storage may be formed as a separate entity, and/or may be accessed from the cabin by the first and/or the second door. Optionally, when the cargo storage comprises a fixed section having the first door in its side wall, the cargo storage may be accessed directly from the outside of the transportation means through the second door. A linear guiding system provided in the cabin floor may replace the aforementioned the linear guiding system. If a cargo loading system is provided in the cargo storage, the cargo loading system may be attached to the linear guiding system provided for introducing load into the cabin floor.

A transportation means comprises the transportation means section and/or the cargo storage. In either way, the cargo storage may be arranged on any deck of the transportation means. If the transportation means is an aircraft having an upper deck and a main deck, the cargo storage is preferably arranged on the main deck.

The transportation means (section) can be reconfigured between a situation in which the cargo storage is in its first and a situation in which the cargo storage is in its second operational state within short duration. In an aircraft, for example, the reconfiguration can occur during the turn-around time, providing higher flexibility for adapting the aircraft configuration to an eventual necessity to transport a larger number of passengers or to transport a larger amount of cargo. Thus, the expandable cargo storage allows for reducing direct operating costs of the transportation means, and, at the same time, enables flexibly and quickly adapting the relation between the space allocated for passengers and the space allocated for cargo aboard the transportation means. Moreover, when the cargo storage is arranged inside the cabin, its exterior design fits the design of the cabin.

A method of operating a cargo storage, a transportation means section or a transportation means described above comprises the steps of displacing the second storage wall away from the first storage wall, and folding one or more of the foldable walls between a first position in which the respective foldable wall is arranged essentially in parallel with the second storage wall and a second position in which the foldable wall is arranged essentially perpendicularly to the second storage wall. By the second step, the cargo storage is modified between a first operational state enclosing a first volume and a second operational state enclosing a second volume larger than the first volume.

BRIEF DESCRIPTION OF THE DRAWINGS

Preferred embodiments of a cargo storage and a transportation means section are described in greater detail with reference to the attached schematic drawings in the following, wherein FIG. 2a shows a top view of the cargo storage according to FIG. 1, wherein each of the foldable walls is in its second position, FIG. 2b shows a side view of the cargo storage according to FIG. 1, wherein each of the foldable walls is in its second position, FIG. 2c shows a front view of the cargo storage according to FIG. 1, wherein each of the foldable walls is in its second position.

DETAILED DESCRIPTION OF THE PREFERRED EMBODIMENTS

Figure 1:
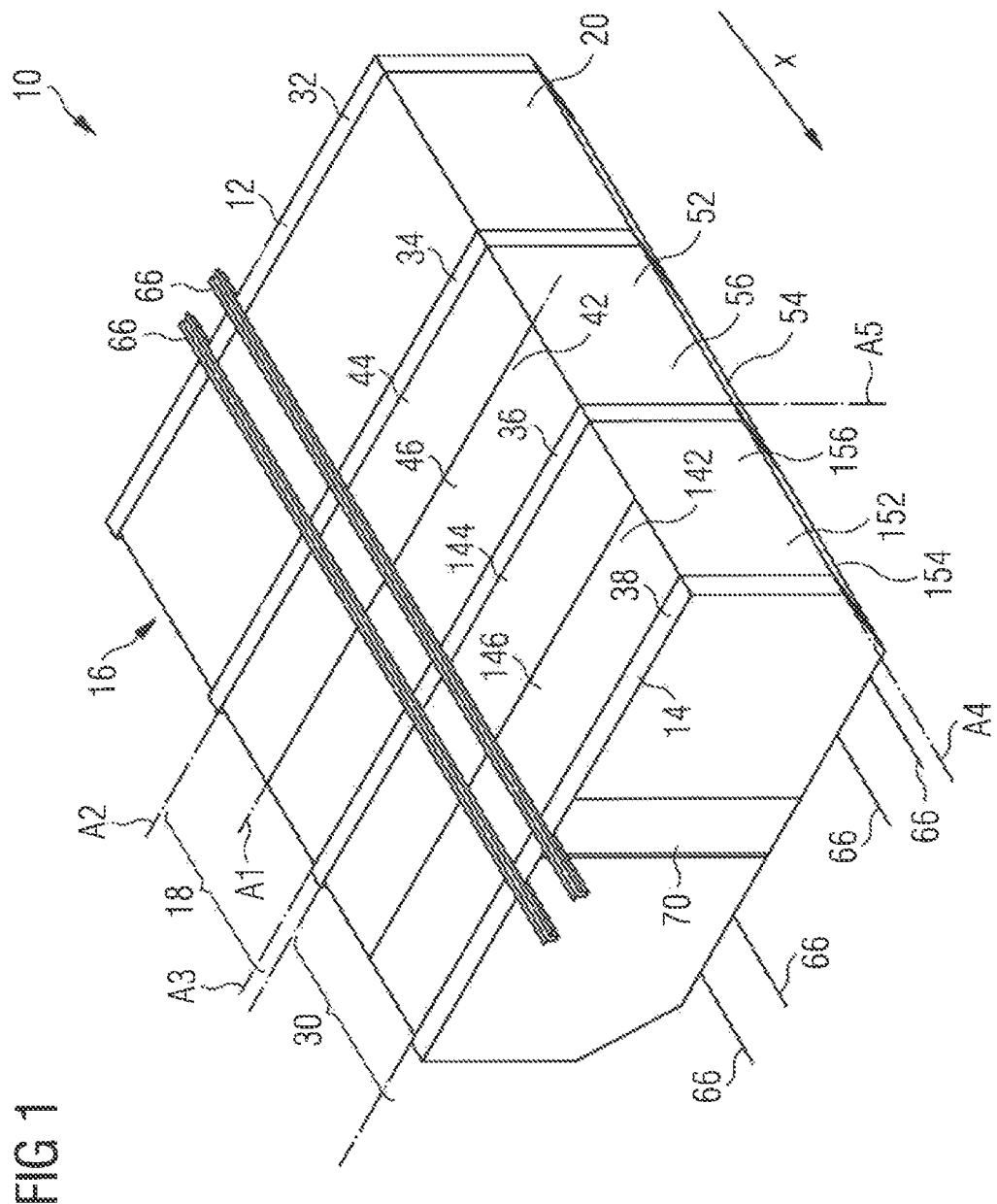
FIG. 1 shows a perspective view of a cargo storage in its second operational state, wherein each of the foldable walls is in its second position.

An expandable cargo storage 10 for a transportation means is shown in FIGS. 1, 2a to 2c, and 3a to 3t. The transportation means is exemplarily an aircraft. The cargo storage 10 comprises a first storage wall 12 and a second storage wall 14 opposite of the first storage wall 12, as well as a plurality of foldable walls arranged between the first and the second storage wall 12, 14. Each of the plurality of foldable walls is foldable between a first position shown in FIG. 3a in which the respective foldable wall is arranged essentially in parallel with the second storage wall 14, and a second position shown in FIGS. 1, 2a to 2c and 3r to 3t in which the foldable wall is arranged essentially perpendicularly to the second storage wall 14. When each of the foldable walls is arranged in its first position, the cargo storage 10 is in a first operational state enclosing a first volume, and, when each of the foldable walls is in its second position, the cargo storage 10 is in a second operational state enclosing a second volume which is about three times as large as the first volume. In the second operational state, the cargo storage 10 is adapted for holding, e.g., up to three so called LD3 air freight containers, and, in this example, has a height of about 1.7 meters, a width of about 4.15 meters and a length of about 4.83 meters. Moreover, an intermediate third operational state of the cargo storage 10 is shown in FIG. 3j, in which a part of the foldable walls is in its second position and the remaining foldable walls are in their first position. In this operational state, the cargo storage 10 encloses a third volume which is about twice as large as the first volume.

Furthermore, the cargo storage 10 has a fixed section 16 and a first expandable section 18 arranged between the fixed section 16 and a second expandable section 30. The fixed section 16 comprises the first storage wall 12 and has the first volume when the cargo storage 10 is in its first, second or intermediate third operational state. A first door 20 is formed in a side wall of the of the cargo storage 10, particularly in the side wall of the fixed section 16 extending perpendicularly to the first and second storage walls 12, 14, and provides access to the interior of the cargo storage 10. The door 20 may be the cargo door of the aircraft. The door 20 comprises an upper portion 22 and a lower portion 24 (cf. FIG. 3b), each pivotable about an associated axis extending in the plane of the ceiling 26 and in the plane of the floor 28 of the cargo storage 10, respectively. The lower portion 24 extends at an angle relative to the upper portion 22 when the first door 20 is closed. Alternatively, the door 20 may be made of one piece instead of two pieces (i.e., instead of upper and lower portions 22, 24).

Figure 6A:
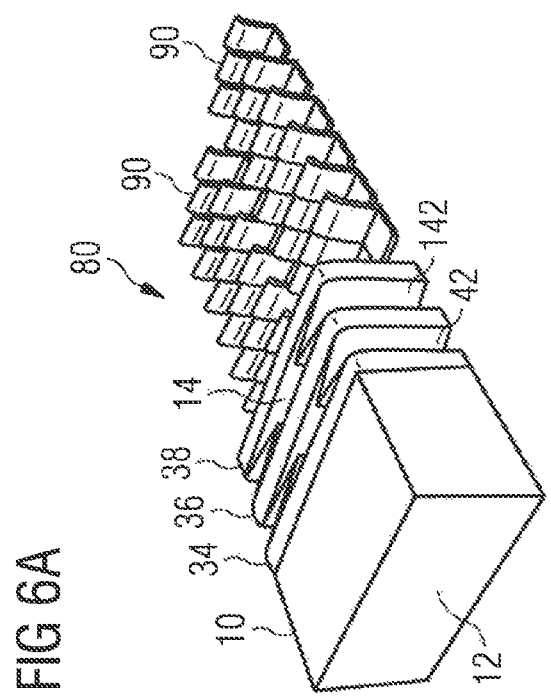
FIGS. 6a and 6b show perspective views of a transportation means section, wherein the cargo storage is shown in intermediate states between its first operational state and its second operational state.
Figure 6B:
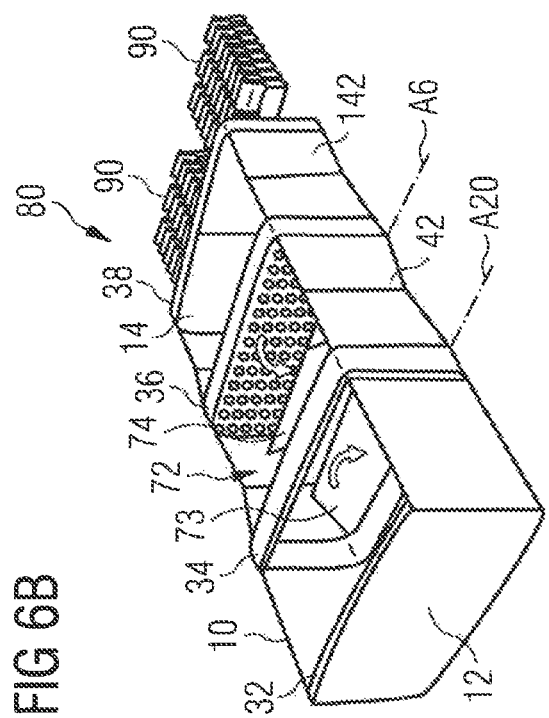
Figure 7A:
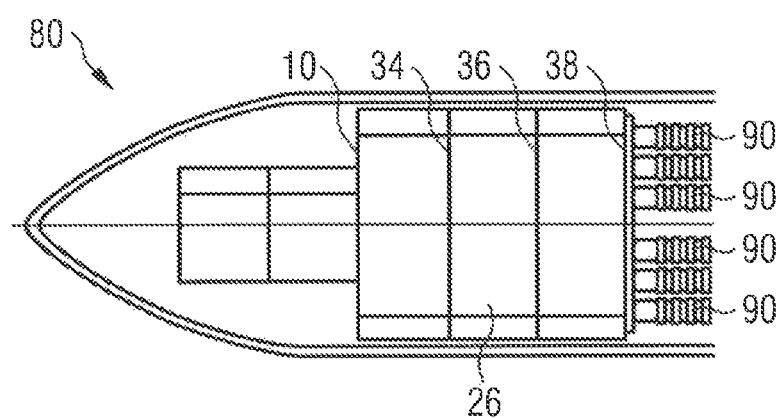
FIG. 7a shows a top view of a transportation means section, wherein the cargo storage is shown in its second operational state.
Figure 7B:
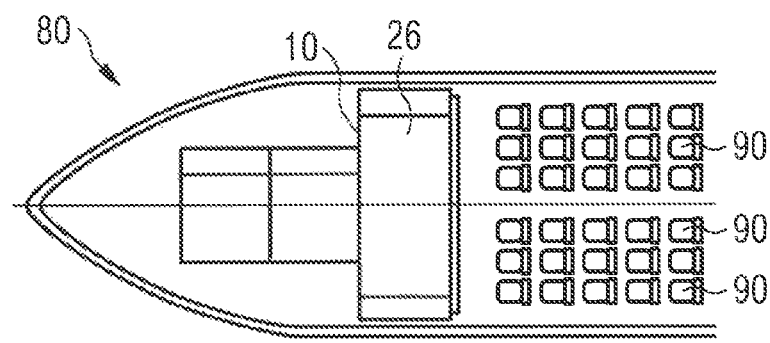
FIG. 7b shows a top view of a transportation means section, wherein the cargo storage is shown in its first operational state.

Supporting portions 32, 34, 36, 38 are arranged between the first storage wall 12 and the second storage wall 14 such as to define cargo bays adjacent to the supporting portions when the cargo storage is in its second operational state. To each of the supporting portions 32, 34, 36, 38, a net (cf. FIG. 6b illustrating such net in supporting portion 36) is fixed, which net is configured for securing pieces of cargo (e.g., luggage pieces) in the event of bulk loading. The net extends in parallel to the first and second storage walls 12, 14.

The fixed section 16 adjoins a first supporting portion 32 formed integrally with the first storage wall 12 and a second supporting portion 34 arranged at the border of the fixed section 16 with the first expandable section 18. A third supporting portion 36 forms part of the first expandable section 18, and is arranged at a side of the first expandable section 18 opposite of the second supporting portion 34. A fourth supporting portion 38 forms part of the second extendable portion 30 and is formed integrally with the second storage wall 14. Thus, the first, second, third and fourth supporting portions 32, 34, 36, 38 together define three cargo bays interconnected by the second and third supporting portions 34, 36.

The third and fourth supporting portions 36, 38 carry some of the plurality of foldable walls. A first foldable wall 42 forming part of these foldable walls comprises a first section 44 and a second section 46. The first section 44 of the first foldable wall 42 is pivotably coupled to the second section 46 of the first foldable wall 42 such as to be foldable relative to the second section 46 about a first axis A1. Moreover, the first section 44 of the first foldable wall 42 is pivotably coupled to the second supporting portion 34 such as to be foldable relative to the second supporting portion 34 about a second axis A2 that is parallel to the first axis A1. The second section 46 of the first foldable wall 42 is further pivotably coupled to the third supporting portion 36 such as to be foldable relative to the third supporting portion 36 about a third axis A3 that is parallel to the first and second axes A1, A2. The first foldable wall 42 forms a part of the ceiling 26 of the cargo storage 10.

A second foldable wall 52 of the plurality of foldable walls comprises a first section 54 and a second section 56. The first section 54 of the second foldable wall 52 is pivotably coupled to the second section 56 of the second foldable wall 52 such as to be foldable relative to the second foldable wall 52 about a fourth axis A4. The second section 56 of the second foldable wall 52 is pivotably coupled to the third supporting portion 36 such as to be foldable relative to the third supporting portion 36 about a fifth axis A5 that is perpendicular to the fourth axis A4. The second foldable wall 52 forms a part of the side wall of the cargo storage 10.

A third foldable wall 62 (see FIGS. 3d and 3e) of the plurality of foldable walls is formed in one flat piece and foldable about a sixth axis A6 extending along the third supporting portion 36. The sixth axis extends in parallel to the axes A1, A2 and A3 and perpendicularly to the axes A4 and A5. The third foldable wall 62 forms a part of the floor 28 of the cargo storage 10, and comprises a hatch or further door (not shown) adapted to allow a human to pass through the third foldable wall 62 when the third foldable wall 62 is in its first position. Such hatch or further door may also be formed in any of the first or second foldable walls 42, 52.

In alternative cargo storages 10, the third foldable wall 62 forms a part of the ceiling or of the side wall of the cargo storage 10, particularly the ceiling or side wall of the respective cargo bay. Accordingly, the first section 44 and the second section 46 of the first foldable wall 42, or the first section 54 and the second section 56 of the second foldable wall 52 may be each combined in one single part, thus, formed like the third foldable wall 62. Vice versa, the cargo bay floor and/or any of the cargo bay side walls may be formed such as to comprise the features of the first foldable wall 42 or the second foldable wall 52, thus, in two sections.

A linear guiding system comprises six substantially equal guiding rails 66 to which each of the first, second, third and fourth supporting portions 32, 34, 36, 38 are attached such as to be displaceable along a first direction X that is perpendicular to the first and second storage walls and perpendicular to each of the axes A1, A2, A3 and A5. Thus, main loads acting on the body of the cargo storage 10 are transmitted through the supporting portions 32, 34, 36, 38 to the linear guiding system. The linear guiding system is connected to a structural part of the transportation means. Optionally, a further (minor) part of the loads may be transmitted to the structural part of the transportation means through the floor of the cargo storage 10.

In an alternative, one or more of the supporting portions, particularly the first and third supporting portions 32, 34 are not displaceable, but stationary, and optionally not attached to the guiding rails 66. The guiding rails 66 extend in parallel to the fourth axis A4. Two of the guiding rails 66 are arranged vertically above and four of the guiding rails 66 are arranged vertically below the cargo storage 10. Moreover, a second door 70 is formed centrally in the second storage wall 14.

Figure 3A:
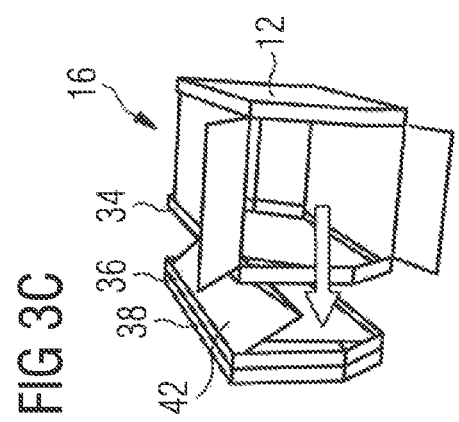
FIGS. 3a to 3t show a sequence of images illustrating the reconfiguration of the cargo storage from its first operational state, in which each of the foldable walls is in its first position, into its second operational state, in which each of the foldable walls is in its second position.
Figure 3B:
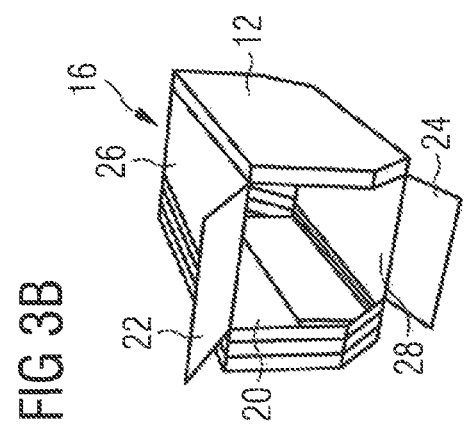
Figure 3C:
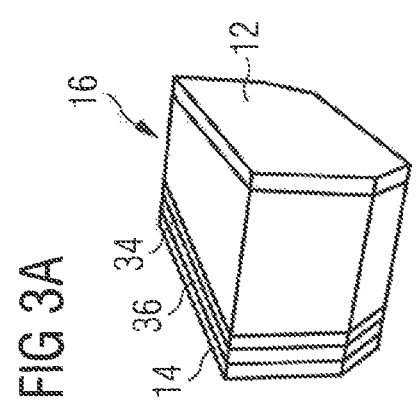
Figure 3D:
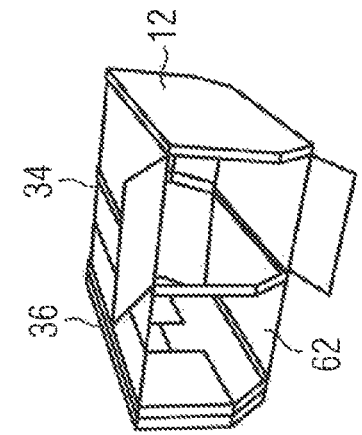
Figure 3E:
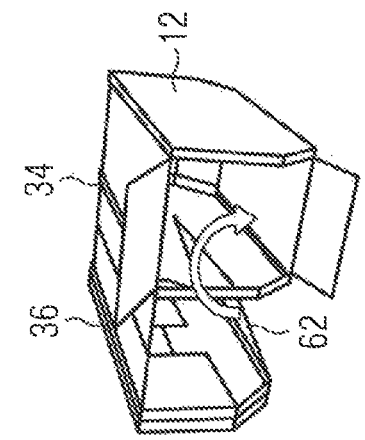
Figure 3F:
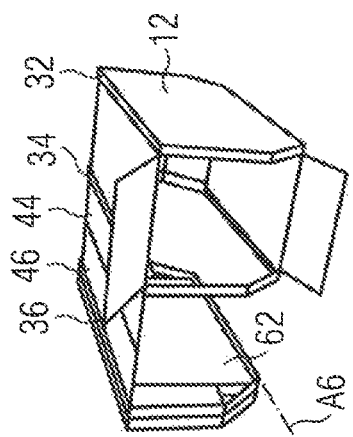
Figure 3G:
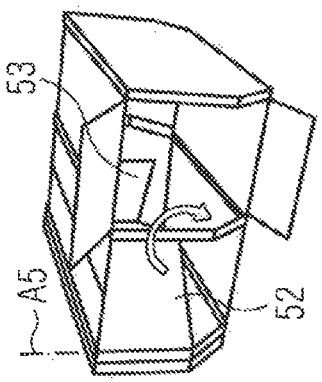
Figure 3H:
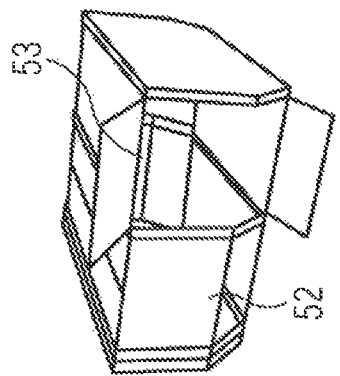
Figure 3I:
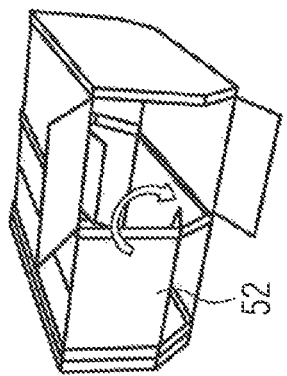
Figure 3J:
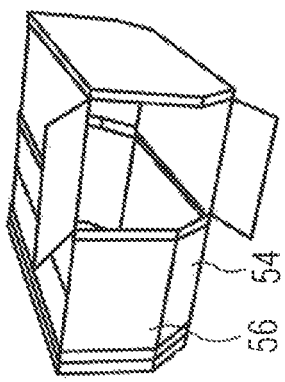
Figure 3K:
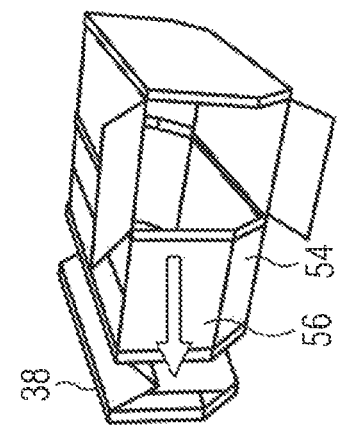
Figure 3L:
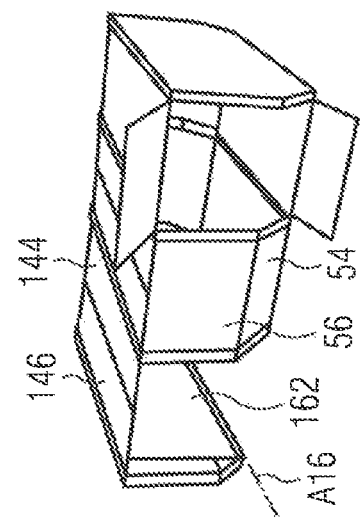
Figure 3M:
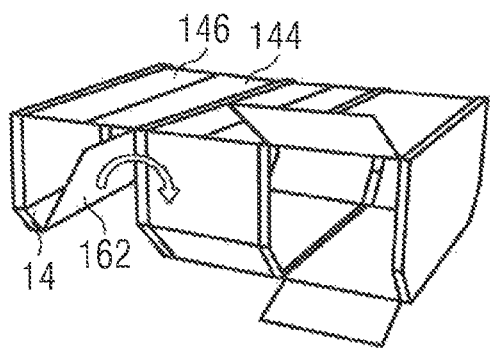
Figure 3N:
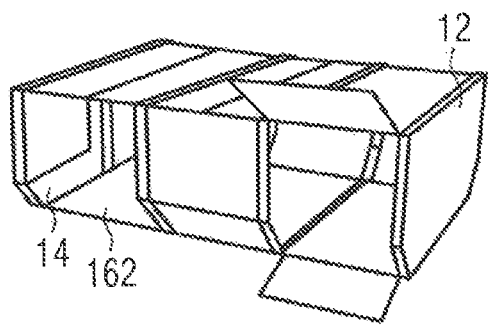
Figure 3O:
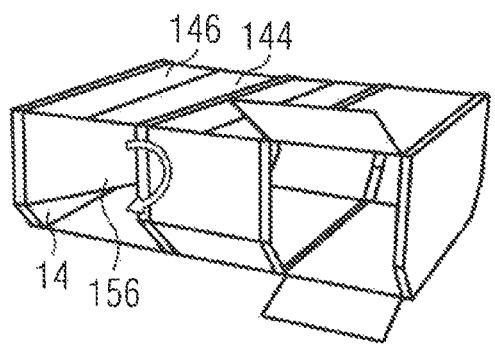
Figure 3P:
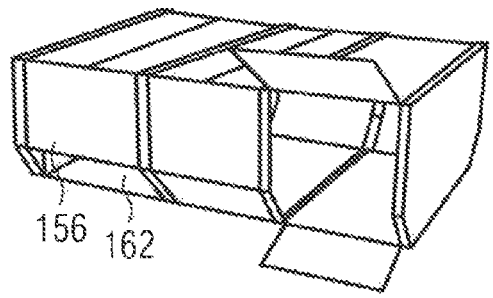
Figure 3Q:
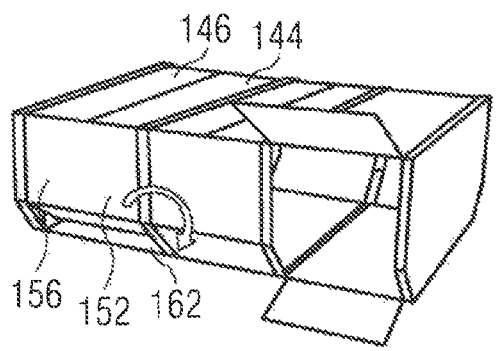
Figure 3R:
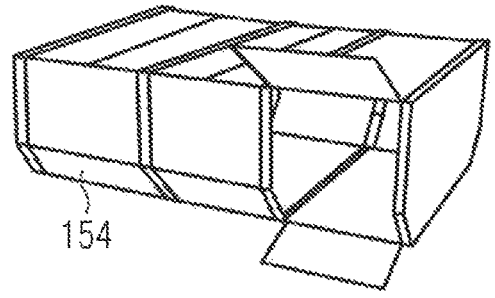
Figure 3S:
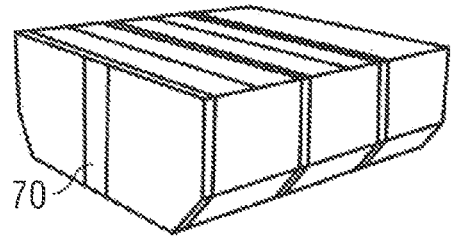
Figure 3T:
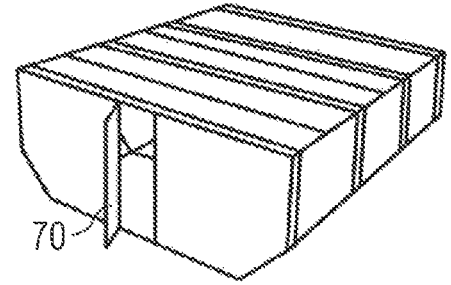

FIGS. 3a to 3t illustrate how the cargo storage is unfolded, i.e. reconfigured from its first operational state (shown in FIG. 3a) to its second operational state (shown in FIGS. 3r, 3s, and 3t), in an image sequence. At first, the first door 20 is opened by pivoting the upper portion 22 upwards and pivoting the lower portion 24 downwards, and the operator accesses the fixed section 16 (FIG. 3b). Alternatively, it is conceivable that the cargo storage 10 is accessed through the second door 70 to start the unfolding process. Moreover, additional openings may be provided in any of the foldable walls, which openings are adapted for allowing the operator to pass through the third and fourth supporting portions 36, 38 when the cargo storage 10 is in its first position (i.e., its collapsed position).

Thereafter, the operator displaces the third and fourth supporting portions 36, 38 as well as any foldable walls associated with supporting portions 36, 38 away from the fixed section 16 in the first direction X (see bulk arrow in FIG. 3c). Thus, the first foldable wall 42 moves from its first position shown in FIG. 3b into its second position shown in FIG. 3c such that its sections 44, 46 together form a plane of the ceiling of the cargo bay next to the cargo bay of the fixed section. Then, the third foldable wall 62 is pivoted from its first (vertical) position about the axis A6 down into its second (horizontal) position such as to form the floor of the respective cargo bay and to connect the bottom of the third supporting portion 36 with the bottom of the second supporting portion 34 (cf. FIGS. 3d to 3f).

Subsequently, the second foldable wall 52 is brought from its first position into its second position, namely by pivoting its first section 54 together with its second section 56 about the fifth axis A5 by about 90 degrees, and pivoting its first section 54 downwards. Herein, the angle by which the first section 54 is further pivoted about the axis A4 is larger than 90 degrees, for example about 135 degrees. In its second position, the first section 54 is inclined relative to any of the first and third foldable walls 42, 62 and to the second section 56 of the second foldable wall 52 (cf. FIGS. 3g to 3j). On the other side of the cargo storage 10 (in FIGS. 3g to 3j the back-most side), another second foldable wall 53 is folded symmetrically to the second foldable wall 52. Thus, an intermediate operational state has been reached in which the cargo volume provided by the cargo storage 10 is twice the cargo volume provided by the fixed section 16. In this intermediate operational state, the cargo storage 10 is hermetically sealed once the first door 20 is closed.

In the following steps shown in FIGS. 3k to 3r, the steps described hereinabove with reference to FIGS. 3c to 3j are essentially repeated, with the only difference that a further cargo bay is expanded between the third supporting portion 36 and the fourth supporting portion 38 instead of between the second supporting portion 34 and the third supporting portion 36.

In particular, the operator displaces the fourth supporting portion 38, as well as any foldable doors associated therewith, away from the third supporting portion 36 in the first direction X (see bulk arrow in FIG. 3k). Thereby, the fourth foldable wall 142 moves from its first position into its second position shown in FIG. 3l such that its first and second sections 144, 146 together form a plane of the ceiling of a further cargo bay next to the second storage wall 14. Then, the sixth foldable wall 162 is pivoted from its first (vertical) position about an axis A16 extending in parallel to the sixth axis A6 down into its second (horizontal) position such as to form the floor of the respective cargo bay (cf. FIGS. 3l to 3n). Subsequently, the fifth foldable wall 152 is brought from its first position into its second position, namely by pivoting its first section 154 together with its second section 156 about an axis parallel to the fifth axis A5 by about 90 degrees, and pivoting its first section 154 downwards. Herein, the angle by which the first section 154 is pivoted about the axis A4 is larger than 90 degrees, for example, it is about 135 degrees. In its second position, the first section 154 is inclined relative to any of the fourth and sixth foldable walls 142, 162 and to the second section 156 of the fifth foldable wall 152 (cf. FIGS. 3o to 3r). On the other side of the cargo storage 10 (in FIGS. 3o to 3r the back-most side), another foldable wall (not shown) is folded symmetrically to the fifth foldable wall 152. Thus, the second operational state has been reached in which the cargo volume enclosed by the cargo storage 10 is three time the cargo volume provided by the fixed section 16. In this second operational state, the cargo storage 10 is hermetically sealed once the first door 20 is closed. The cargo storage can then be accessed by the second door 70 as shown in FIGS. 3s and 3t.

Figure 4:
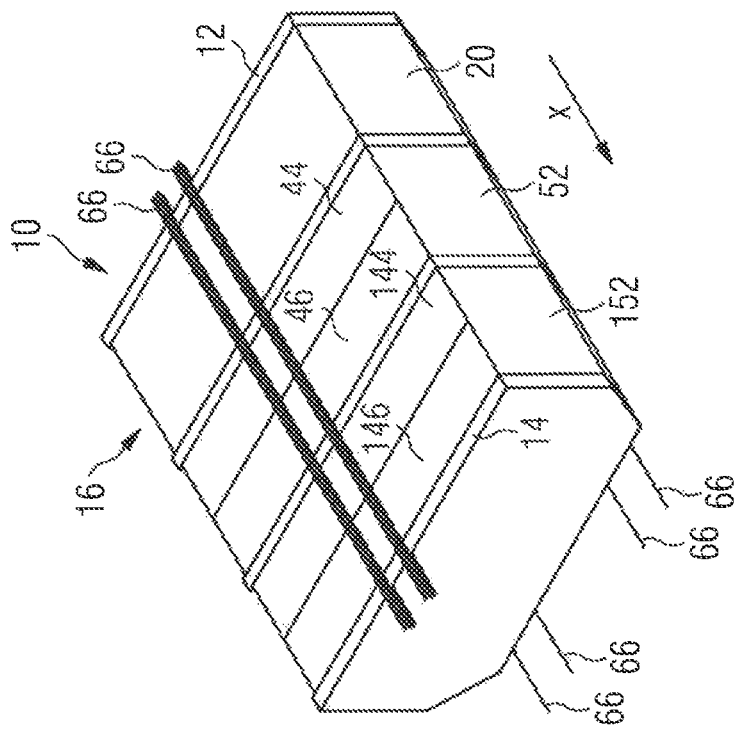
FIG. 4 shows a perspective view of an alternative cargo storage in its second operational state, wherein each of the foldable walls is in its second position.

An alternative cargo storage 10 is shown in FIG. 4. In this cargo storage 10, the second door 70 is missing. Alternatively, it is conceivable that the first door 20 is missing. Otherwise, the structure and function of the alternative cargo storage 10 corresponds to the structure and function of the cargo storage 10 of FIG. 1.

Figure 5:
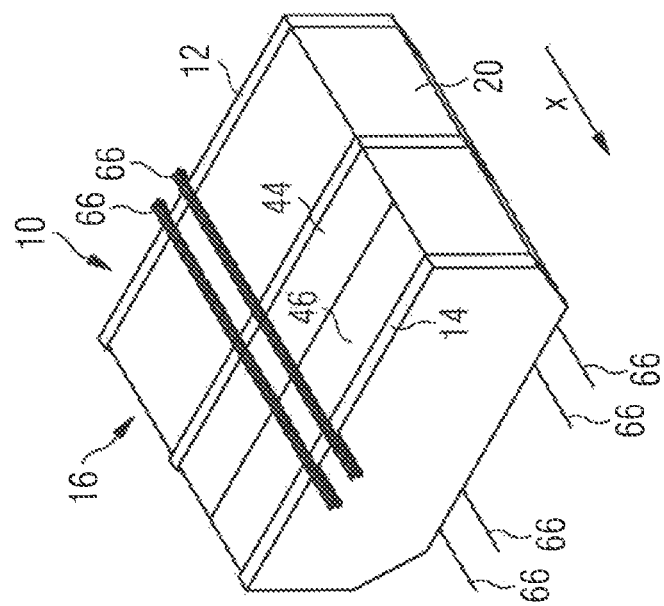
FIG. 5 shows a perspective view of a further alternative cargo storage in its second operational state, wherein each of the foldable walls is in its second position.

A yet further alternative cargo storage 10 is shown in FIG. 5. In this cargo storage 10, the second expandable section 30 is missing. Moreover, it is conceivable that the second expandable section 30 is replaced by a further fixed section 16. Otherwise, the structure and function of the alternative cargo storage 10 corresponds to the structure and function of the cargo storage 10 of FIG. 1.

A transportation means section 80 shown in FIGS. 6a, 6b, 7a and 7b comprises a further alternative cargo storage 10. This cargo storage 10 differentiates from the cargo storage 10 of FIG. 1 in that the first and fourth foldable walls 42, 142 form the side walls, and pairs of foldable walls (in these figures only the lower pair is shown) form the floor and the ceiling of the respective cargo bay, respectively. For example, the floor of the cargo bays is formed by a seventh foldable wall 72 comprising a first section 73 and a second section 74, wherein the second section 74 is configured like the third foldable wall 62 except of extending only over a part of the distance between the second and third supporting portion 34, 36 in its second position. The remaining gap, i.e. the remaining part of this distance, is filled by the first section 73 which is pivotably attached to the second supporting portion 34 and foldable about an axis A20 extending in parallel to the axis A6. Analogously, the floor between the third and the fourth supporting portion 36, 38 and the ceilings of the cargo bays in the first and second extendable sections 18, 30 may be formed. Otherwise, the structure and function of the alternative cargo storage 10 corresponds to the structure and function of the cargo storage 10 shown in FIG. 1.

Furthermore, it is conceivable that the transportation means section comprises any number of each of the cargo storages 10 of FIG. 1 instead of or in addition to the one cargo storage 10 shown in FIGS. 6a to 7b.

The transportation means section 80 is a front section of an aircraft, and comprises a plurality of essentially equal foldable seats 90. Each foldable seat is adapted for being displaced perpendicularly to the first and the second storage wall by means of a guiding system (not shown) between a first state shown in FIG. 6a and a second state shown in FIG. 6b. In the first state, each seat 90 is essentially unfolded, such that a passenger can sit on it while on board, and arranged in a first position. In the second state, the seat 90 is essentially folded and arranged in a second position. The second position is farther away from the first storage wall 12 than the first position. On the other hand, in the second position of the seats, a part of the seats is arranged closer to the second storage wall 14, whereas another part of the seats is arranged at the same distance from the second storage wall 4 as in their first position. Moreover, when the seat is folded, its seating surface is folded up such as to face the backrest of the seat. Thus, in the second position, the size of the seat in the first direction X is smaller than in the first position.

Accordingly, by folding and displacing the seats from their first position into their second position, a space to which the cargo storage can be expanded when the cargo storage is in its second operational state is cleared. Given a constant overall size of the transportation means section, the space allocated for passengers is thereby reduced and the space allocated for cargo is increased. Vice versa, by contracting the cargo storage, e.g. into its first operational state, and unfolding and displacing the seats from their second position into their first position, the space previously occupied by the cargo storage is cleared. Thus, the space allocated for passengers is increased and the space allocated for cargo is reduced. Accordingly, the aircraft can be flexibly adapted to situational space requirements.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An expandable cargo storage for a transportation means, comprising
   a first storage wall and a second storage wall opposite of the first storage wall, and
   a plurality of foldable walls arranged between the first and the second storage wall, each of the plurality of foldable walls being foldable between a first position in which the respective foldable wall is arranged essentially in parallel with the second storage wall, and a second position in which the foldable wall is arranged essentially perpendicularly to the second storage wall,
   wherein, when each of the foldable walls is arranged in its first position, the cargo storage is in a first operational state enclosing a first volume, and when each of the foldable walls is in its second position, the cargo storage is in a second operational state enclosing a second volume which is larger than the first volume,
   further comprising a first expandable section which comprises at least a part of the plurality of foldable walls, the first expandable section comprises one or more supporting portions arranged between the first storage wall and the second storage wall such as to define one or more cargo bays adjacent to the supporting portions when the cargo storage is in its second operational state,
   wherein a first foldable wall of the plurality of foldable walls comprises a first section and a second section,
   wherein the first section of the first foldable wall is pivotably coupled to the second section of the first foldable wall such as to be foldable relative to the second section about a first axis, and
   wherein the first section of the first foldable wall is further pivotably coupled to a first one of the supporting portions such as to be foldable relative to the first supporting portion about a second axis that is parallel to the first axis, wherein the second section of the first foldable wall is further pivotably coupled to a second one of the supporting portions such as to be foldable relative to the second supporting portion about a third axis that is parallel to the first axis, wherein a second foldable wall of the plurality of foldable walls comprises a first section and a second section, wherein the first section of the second foldable wall is pivotably coupled to the second section of the second foldable wall such as to be foldable relative to the second of the second foldable wall about a fourth axis that is perpendicular to the first axis, wherein the second section of the second foldable wall is pivotably coupled to the second one of the supporting portions such as to be foldable relative to the second supporting portion about a fifth axis that is perpendicular the fourth axis and the cargo storage further comprising a fixed compartment extending between the first storage wall or the second storage wall and the expandable section, wherein the fixed section has the same dimensions when the cargo storage is in its first operational state and when the cargo storage is in its second operational state.

2. The cargo storage according to claim 1, further comprising a door for providing access to the interior of the cargo storage, wherein the door is arranged in the first storage wall, in the second storage wall, or in at least one of the plurality of foldable walls.

3. The cargo storage according to claim 1, wherein each of the supporting portions is adapted to interconnect two of the cargo bays, and carries one or more of the plurality of foldable walls.

4. The cargo storage according to claim 1, wherein a third foldable wall of the plurality of foldable walls is formed in one flat piece and is foldable about a sixth axis extending in parallel with a fourth one of the supporting portions.

5. The cargo storage according to claim 1, wherein at least one of the first, the second and the third supporting portion is formed integrally with the first or the second storage wall.

6. The cargo storage according to claim 1, further comprising one or more second expandable sections, wherein the first expandable section is arranged between the fixed section and the second expandable sections.

7. The cargo storage according to claim 1, further comprising a linear guiding system adapted for linearly guiding the first storage wall in a direction perpendicular to at least one of the first storage wall and the second storage wall in a direction perpendicular to the second storage wall.

8. A transportation means section, comprising a cargo storage according to claim 1, and at least one foldable seat, adapted for being displaced perpendicularly to at least one of the first and the second storage wall between a first state in which the seat is unfolded and arranged in a first position, and a second state in which the seat is folded and arranged in a second position farther away from the first storage wall than the first position, in order to clear a space to which the cargo storage is expanded when the cargo storage is in its second operational state.

9. A transportation means having the transportation means section according to claim 8.

10. A method of operating a cargo storage according to claim 1, comprising the steps:

displacing the second storage wall away from the first storage wall;

folding one or more of the foldable walls between a first position in which the respective foldable wall is arranged essentially in parallel with the second storage wall, and a second position in which the foldable wall is arranged essentially perpendicularly to the second storage wall such as to modify the cargo storage between a first operational state enclosing a first volume and a second operational state enclosing a second volume larger than the first volume.

* * * * *